(12) United States Patent
Guillez et al.

(10) Patent No.: US 6,830,285 B2
(45) Date of Patent: Dec. 14, 2004

(54) DEVICE FOR REINFORCING A VEHICLE IN PARTICULAR EQUIPPED WITH A RETRACTABLE ROOF

(75) Inventors: Jean-Marc Guillez, Cirieres (FR); Gérard Queveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/415,393

(22) PCT Filed: Oct. 12, 2001

(86) PCT No.: PCT/FR01/03173

§ 371 (c)(1),
(2), (4) Date: Apr. 25, 2003

(87) PCT Pub. No.: WO02/34557

PCT Pub. Date: May 2, 2002

(65) Prior Publication Data

US 2004/0026963 A1 Feb. 12, 2004

(30) Foreign Application Priority Data

Oct. 27, 2000 (FR) .......................................... 00 13842

(51) Int. Cl.$^7$ ................................................ B60J 5/00
(52) U.S. Cl. ............................ 296/146.6; 296/187.12; 296/146.9
(58) Field of Search ...................... 296/187.03, 187.05, 296/187.12, 146.6, 146.9, 202

(56) References Cited

U.S. PATENT DOCUMENTS

| | | | | | |
|---|---|---|---|---|---|
| 4,293,160 | A | * | 10/1981 | Lutze et al. | 296/187.12 |
| 5,224,752 | A | * | 7/1993 | Marshall | 296/146.6 |
| 5,431,476 | A | * | 7/1995 | Torigaki | 296/187.12 |
| 6,601,910 | B1 | * | 8/2003 | Duggan | 296/146.6 |
| 2002/0063440 | A1 | * | 5/2002 | Spurr et al. | 296/146.9 |

FOREIGN PATENT DOCUMENTS

DE      19828444 A1  * 12/1999

* cited by examiner

Primary Examiner—Jason Morrow
(74) Attorney, Agent, or Firm—Nawrocki, Rooney & Sivertson, P.A.

(57) ABSTRACT

The invention concerns a device for reinforcing a vehicle, in particular, a vehicle equipped with a retractable roof comprising of a rigid ring (3) enclosing the vehicle passenger compartment (4), the rigid ring (3) comprising elements (5,6,7) secured to the fixed parts of a body of the vehicle and of mobile elements (8,9) integrated in an upper part of vehicle doors (1,2), the mobile elements (8,9) being located in an extension of the fixed elements (5,6,7) when the doors (1,2) are closed, each mobile element (8,9) comprising at each of its ends locking devices mobile between an unlocking position and a locking position wherein the mobile elements (8,9,) are rigidly linked to the fixed elements (5,6,7) and form together a ring (3) having a uniformly distributed rigidity about the vehicle passenger compartment (4).

15 Claims, 4 Drawing Sheets

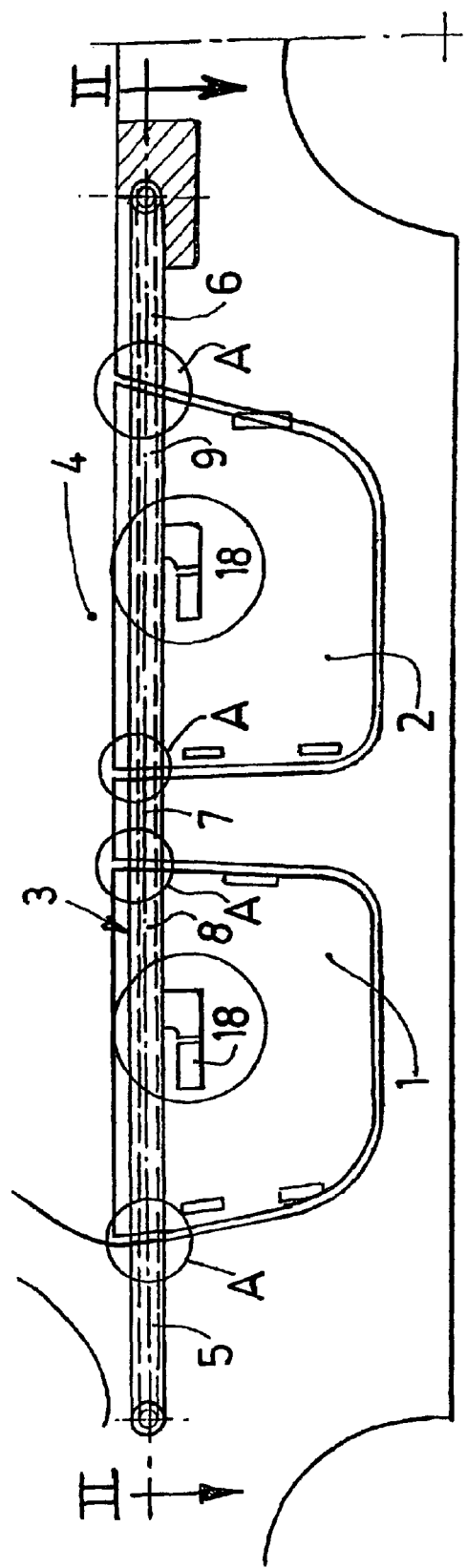
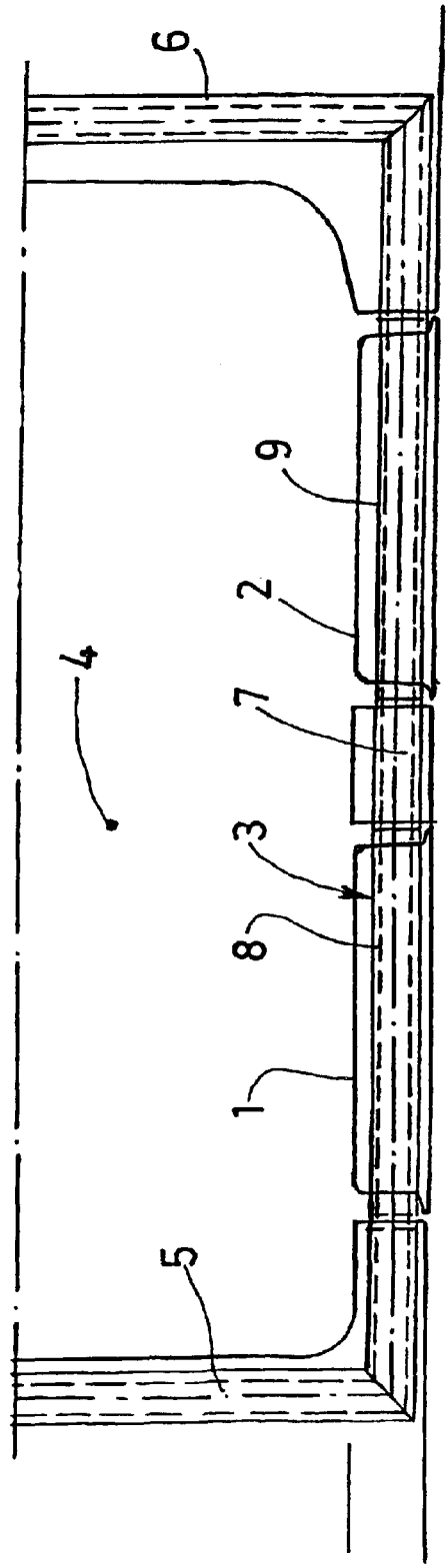

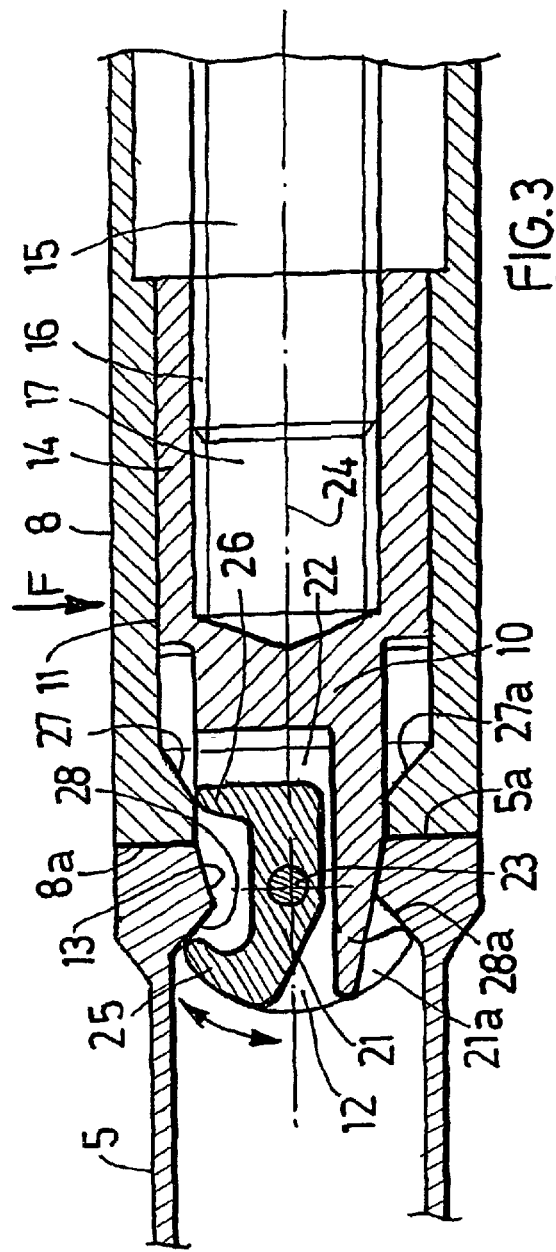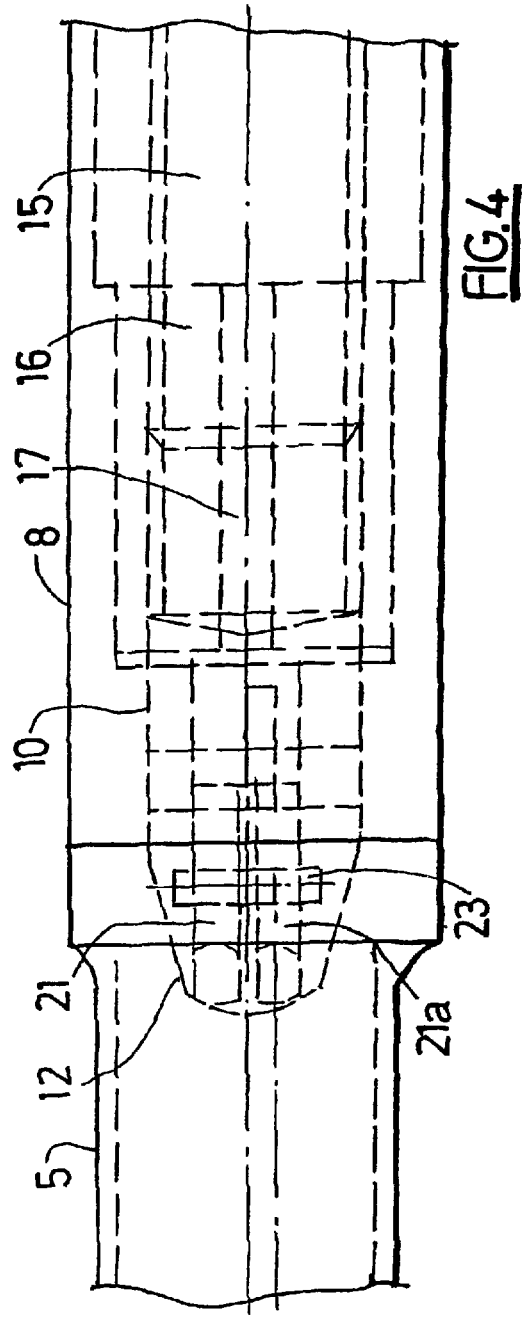

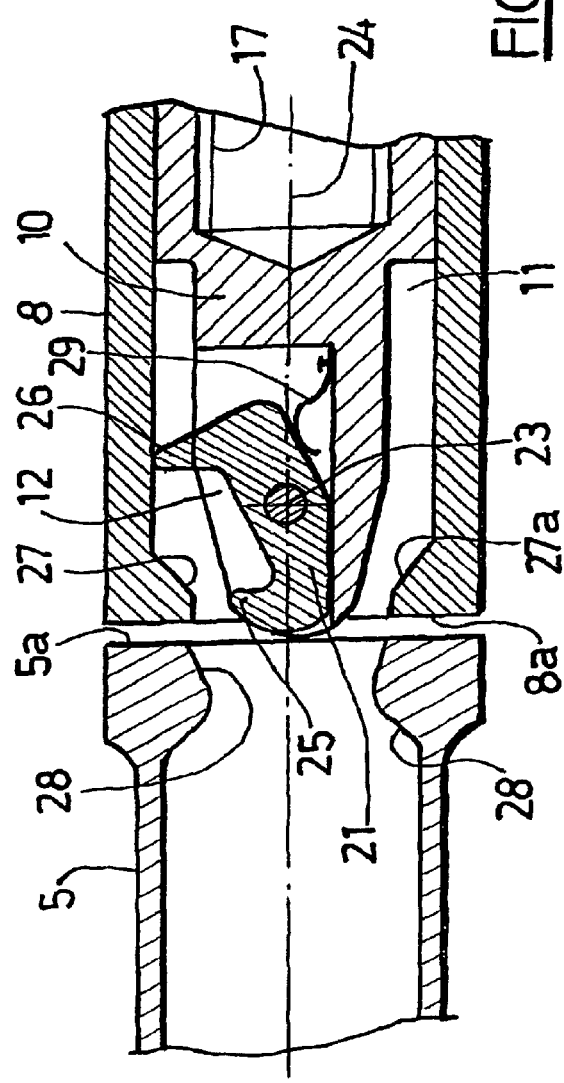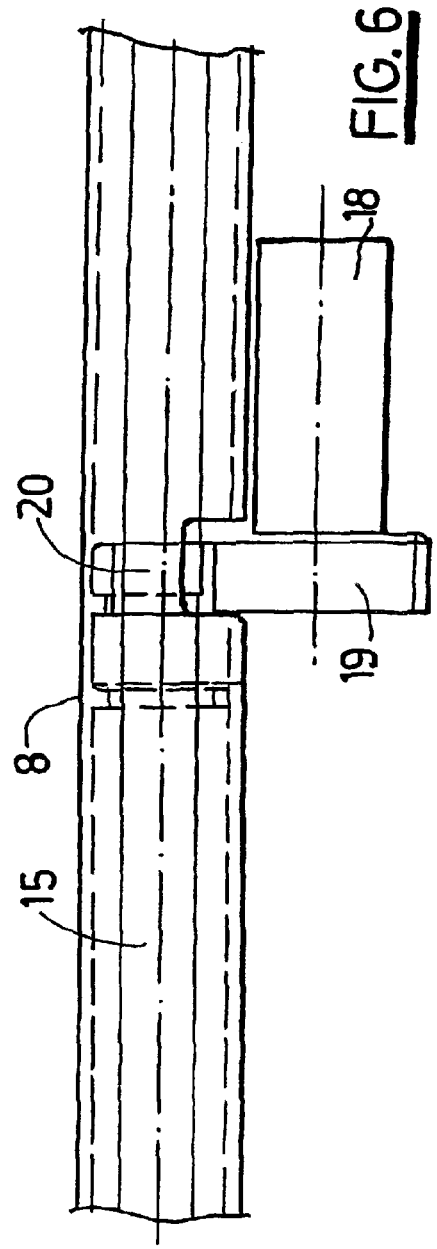

DEVICE FOR REINFORCING A VEHICLE IN PARTICULAR EQUIPPED WITH A RETRACTABLE ROOF

This is a United States national patent application filed under 35 U.S.C. §371 claiming priority under 35 U.S.C. §365(b) to French National Patent Application Serial No. 0013842 filed Oct. 27, 2000.

TECHNICAL FIELD

The present invention relates to a device for reinforcing a vehicle, in particular, a vehicle equipped with a retractable roof.

BACKGROUND OF THE INVENTION

It is known that cabriolet type vehicles or vehicles with a retractable roof when the elements of the roof are stored in the vehicle luggage compartment have a rigidity to bending and twisting, as well as a resistance to side impacts, which is reduced compared with those of a vehicle with a non-retractable rigid roof. This is because the rigid roof and the side uprights contribute significantly to the rigidity of the body. The above problem arises especially in the case of four-door vehicles equipped with a retractable roof. This is because, in these vehicles, the lower longitudinal members of the chassis are longer than in two-door vehicles and therefore these longitudinal members no longer provide sufficient strength as regards twisting and bending. The aim of the present invention is to remedy the above drawbacks.

SUMMARY OF THE INVENTION

According to the invention, a device for reinforcing a vehicle, in particular, a vehicle equipped with a retractable roof is characterised in that it comprises at least one rigid element secured to a fixed part of the body and at least one mobile element integrated in the upper part of at least one door of the vehicle, said mobile element being located in the extension of the fixed element when the door is closed, each mobile element comprising, at its end adjacent to the mobile element, locking means mobile between an unlocking position and a locking position wherein the mobile element is rigidly linked to the fixed element and form together a reinforcing bar whereof the rigidity is uniformly distributed over the entire length of said bar.

In an advantageous version, the reinforcing device comprises a rigid ring enclosing the vehicle passenger compartment, said rigid ring consisting of elements secured to the fixed parts of the body and of mobile elements integrated in the upper part of the vehicle doors, said mobile elements being located in the extension of the fixed elements when the doors are closed, each mobile element comprising, at each of its ends, locking means mobile between an unlocking position and a locking position wherein the mobile elements are rigidly linked to the fixed elements and form together a ring whereof the rigidity is uniformly distributed all around the vehicle passenger compartment.

Preferably, in the case of a four-door vehicle, the ring comprises an arch-shaped fixed front element, an arch-shaped fixed rear element, a fixed side element extending on each side of the vehicle and contained between two mobile elements integrated in the two doors, each of said two elements being adjacent to one end of an arch-shaped element.

Other specific features and advantages of the invention will emerge further in the following description.

BRIEF DESCRIPTION OF THE DRAWINGS

In the accompanying drawings, given as non-limitative examples:

FIG. 1 is a schematic view in elevation and partial longitudinal section of a vehicle equipped with a reinforcing device according to the invention;

FIG. 2 is a half-view in section along the plane II—II of FIG. 1;

FIG. 3 is a sectional view, on an enlarged scale, of a detail A of FIG. 1, showing two elements in the locked position;

FIG. 4 is a view along the arrow F of FIG. 3;

FIG. 5 is a view similar to FIG. 3, showing the two elements in the unlocked position;

FIG. 6 is a schematic plan view, showing the motor and the shaft for controlling the sliding of the slide for locking the elements;

DETAILED DESCRIPTION OF THE INVENTION

Figure 7:
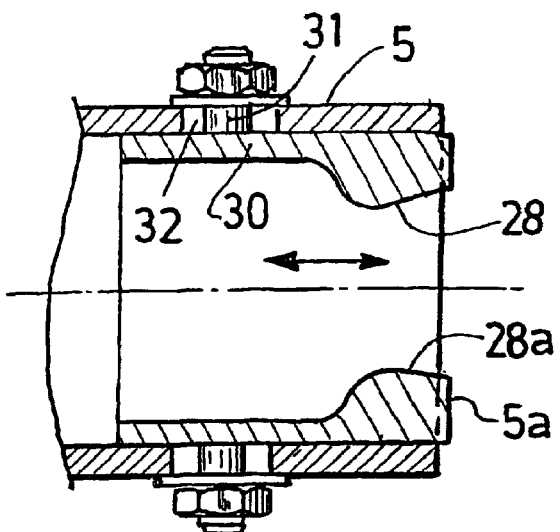
FIG. 7 is a partial longitudinal sectional view of an element, according to a variant embodiment of the invention.

FIGS. 1 and 2 depict a device for reinforcing a vehicle with four doors 1, 2, particularly one equipped with a retractable roof (not depicted). In accordance with the invention, said reinforcing device comprises a rigid ring 3 enclosing the vehicle passenger compartment 4; said rigid ring 3 comprises elements 5, 6, 7 secured to the fixed parts of the body and of mobile elements 8, 9 integrated in the upper part of the vehicle doors 1, 2. The mobile elements 8, 9 are located in the extension of the fixed elements 5, 6, 7 when the doors 1, 2 are closed.

Each mobile element 8, 9 comprises, at each of its ends, locking means mobile between an unlocking position (see FIG. 5) and a locking position (see FIG. 3) wherein the mobile elements 8, 9 are rigidly linked to the fixed elements 5, 6, 7 and form together a ring whereof the rigidity is uniformly distributed all around the vehicle passenger compartment 4. The locking means are described later in more detail.

In the example depicted, the ring 3 comprises an arch-shaped fixed front element 5, an arch-shaped fixed rear element 6, a fixed side element 7 extending on each side of the vehicle and contained between two mobile elements 8, 9 integrated in the two doors 1, 2. Each of said two mobile elements 8, 9 is adjacent to one end of an arch-shaped fixed element 5, 6.

As illustrated by FIG. 3, the locking means comprise means making it possible to centre the elements, such as 8 and 5, with respect to one another, and means for clamping the end faces 8a, 5a of the elements 8, 5 to one another. Preferably, but not necessarily, the elements 8, 5 are tubular.

In the example depicted in FIGS. 3, 4 and 5, the locking means comprise a slide 10 mounted so as to slide in a bore 11 formed in the element 8 and carrying at its end a cone 12 projecting in the locking position from the end face 8a of the element 8 in order to fit into a complementary recess 13 formed in the end face 5a of the other element 5. The bore 11 has at least one axial groove wherein there is fitted a cotter pin 14 (i.e., more generally, a key, integral with the slide 10 for axially guiding the sliding of said slide 10 and immobilising it rotationally. It can moreover be seen in FIG. 3 that the sliding of the slide 10 is controlled by a shaft 15 extending axially in the element 8 and having a threaded end 16 fitted in a tapped bore 17 made in the slide 10.

As shown by FIG. 6, the shaft 15 is coupled to an electric motor 18 for driving it rotationally. To that end, the output shaft of the motor 18 has a pinion 19 engaged with a pinion 20 linked to the shaft 15.

Furthermore, as also shown by FIG. 3, the locking means also comprise at least one clamping jaw 21 mounted so as to pivot in a housing 22 in the cone 12 along an axis 23 perpendicular to the axis 24 of the slide 10. The jaw 21 has at each end a bearing surface 25, 26 projecting in a direction opposite to the axis 24 of the slide 10.

Each element 8, 5 has inside it, close to its end face 8a, 5a an inclined ramp 27, 28. Said inclined ramps 27, 28 cooperate with the projecting bearing surfaces 25, 26 of the jaw 21 so that, upon fitting of the cone 12 into the recess 13 of the adjacent element 5, the pressing of the bearing surface 26 located at the rear of the jaw 21 on the corresponding ramp 27 causes the pivoting of the jaw 21 and the pressing of the front bearing surface 25 thereof against the ramp 28 of the adjacent element 5.

Preferably, as indicated in FIGS. 3 and 4, the device comprises a second jaw 21a mounted on the same axis 23 and cooperating with inclined ramps 27a, 28a disposed symmetrically with respect to those cooperating with the first jaw 21. As illustrated by FIG. 5, each jaw such as 21 cooperates with a spring 29 tending to make the jaw 21 pivot towards a position opposite the ramps 27, 28.

In the version illustrated by FIG. 7, the element 5 has at its end a sleeve 30 secured so as to be adjustable inside the element in order to make it possible to axially adjust the position of its end face 5a. The internal face of the sleeve 30 carries the inclined ramps. In this example, the adjustable fixing is provided by bolts 31 fitted in oblong openings 32.

An explanation will now be given of the operation of the device which has just been described.

In the unlocked position depicted by FIG. 5, the cone 12 is fitted inside the bore 11 of the element 8 and the jaw 21 is in the inactive position, the rear bearing surface 26 resting on the internal face of the element 8. In this position, the vehicle door in which the reinforcing element 8 is integrated can be opened.

In order to lock the element 8 to the element 5, the motor 18 is started. Said motor rotationally drives the shaft 15 whereof the threaded end 16 will unscrew from the tapping 17 of the slide 10, which causes the translational movement of the slide 10 forwards. This translational movement causes fitting of the cone 12 into the recess 13 of the element 5. Before the limit of travel of the cone 12, the rear bearing surface 26 of the jaw 21 comes to rest on the ramp 27, which causes the jaw 21 to swing around the axis 23 and, at the limit of travel, the front bearing surface 25 to press on the ramp 28 of the element 5.

At the limit of travel, the cone 12 is fully fitted in the recess 13 of the element 5, which provides a perfect centering or alignment of the element 8 with respect to the element 5. Moreover, the pressing of the bearing surfaces 25 of the jaws 21 and 21a on the inclined ramps 28 and 28a not only locks together the elements 8 and 5, but clamps the end faces 8a and 5a against one another. This clamping of the elements against one another over the entire periphery of the vehicle has the effect that the ring 3 behaves like a single-piece rigid ring which considerably increases the resistance of the vehicle to bending, twisting and side impacts.

Figure 8:
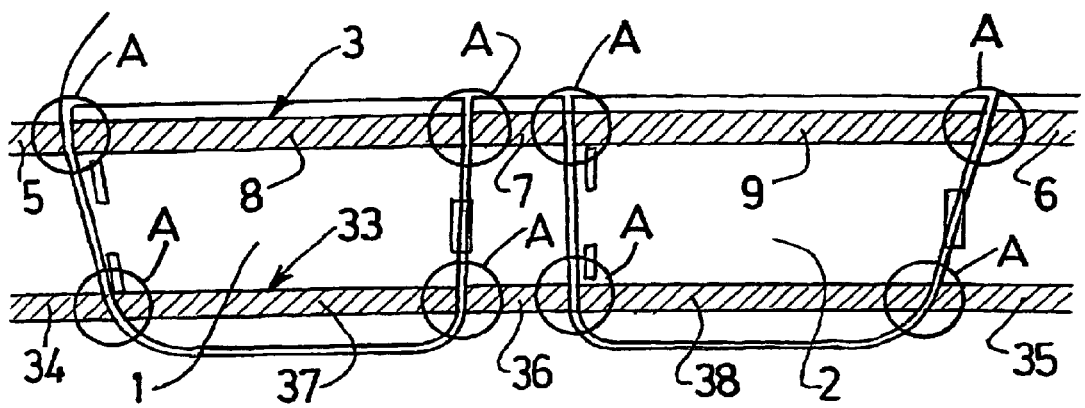
FIG. 8 is a view similar to FIG. 1, showing a more effective version of the reinforcing device according to the invention.

The more effective version of the reinforcing device depicted in FIG. 8 comprises a second rigid ring 33 parallel to the first ring 3, consisting of fixed elements 34, 35, 36 and mobile elements 37, 38. The mobile elements 37, 38 are integrated in the lower part of each door 1, 2 and linked to the fixed elements by locking means identical to those which link the elements of the first ring 3. The above device gives the vehicle an excellent resistance to side impacts.

Figure 9:
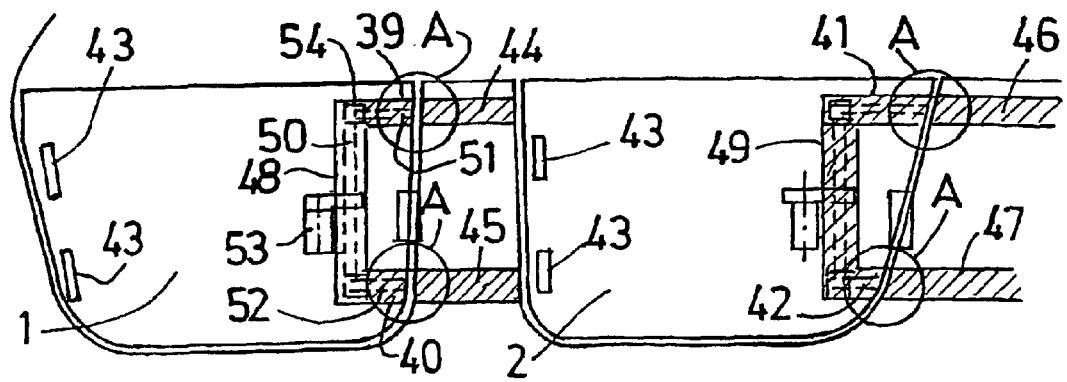
FIG. 9 is a view similar to FIGS. 1 and 8, showing another embodiment of the invention.

In the version illustrated by FIG. 9, each door 1, 2 has an upper rigid element 39, 41 and a lower rigid element 40, 42 extending horizontally from the edge of the door opposite to the hinges 43 thereof. The two elements 39, 40 and 41, 42 are located in the extension of two rigid elements 44, 45; 46, 47 secured to a fixed part of the body. Furthermore, the two elements 39, 40; 41, 42 integrated in the door 1, 2 are linked to one another by a vertical rigid element 48, 49.

It can also be seen in FIG. 9 that the means providing the locking between the mobile elements 39, 40; 41, 42 and fixed elements 44, 45; 46, 47 comprise shafts 50, 51, 52 mounted so as to rotate in the elements integrated in the door 1, 2 and driven by a motor 53. The shaft 50 extending in the vertical element 48, 49 is linked by bevel gears 54 to the shafts 51, 52 extending in the other two elements.

The reinforcing device illustrated by FIG. 9 is less effective than those depicted in FIGS. 1 and 8, however, in the case of FIG. 9, the reinforcement is located in the sensitive central area of the vehicle, with the hinges 43 offering a rigidity which may suffice. Of course, the invention is not limited to the examples just described and many modification can be made thereto without departing from the scope of the invention.

What is claimed is:

1. A device for reinforcing a vehicle in equipped with a retractable roof, comprising at least one rigid element (5, 6, 7) secured to a fixed part of a body of the vehicle and at least one mobile element (8, 9) integrated in an upper part of at least one door (1, 2) of the vehicle, said at least one mobile element (8, 9) being located in an extension of said at least one rigid element (5, 6, 7) when said at least one door (1, 2) is closed, each mobile element (8, 9) comprising, at an end adjacent said at least one mobile element (8, 9), locking means actuatable between an unlocking position and a locking position wherein said mobile element (8, 9) is rigidly linked to said at least one rigid element (5, 6, 7) and form together a reinforcing bar extending over a length of a vehicle passenger compartment (4), whereof rigidity is uniformly distributed over an entire length of said reinforcing bar.

2. A device according to claim 1, wherein said reinforcing bar comprises a rigid ring (3) enclosing said vehicle passenger compartment (4), said rigid ring (3) including said rigid elements (5, 6, 7) and said mobile elements (8, 9), said mobile elements (8, 9) being located in the extension of said at least one rigid element (5, 6, 7) when said at least one door (1, 2) is closed, each mobile element (8, 9) including, at each of its ends, locking means actuatable between an unlocking position and a locking position wherein each of said mobile elements (8, 9) are rigidly linked to said at least one rigid element (5, 6, 7), and form together said ring (3) whereof rigidity is uniformly distributed all around the vehicle passenger compartment (4).

3. A device for reinforcing a four-door vehicle equipped with a retractable roof comprising, at least one rigid element (5, 6, 7) secured to a fixed part of a body of the vehicle, and at least one mobile element (8, 9) integrated in an upper part of at least one door (1, 2) of the vehicle, said at least one mobile element (8, 9) located in an extension of said at least one rigid element (5, 6, 7) when said at least one door (1, 2) is closed, each mobile element (8, 9) comprising, at an end adjacent said at least one mobile element (8, 9), locking means actuatable between an unlocking position and a locking position wherein said mobile element (8, 9) is rigidly linked to said at least one rigid element (5, 6, 7) and form together a rigid ring (3) enclosing a vehicle passenger compartment (4) of the vehicle such that the rigidity is uniformly distributed all around the vehicle passenger compartment (4), said mobile elements (8, 9) positioned in an extension of said at least one rigid element (5, 6, 7) when said at least one door (1, 2) is closed, each mobile element (8, 9) including, at each of its ends, locking means actuatable between an unlocking position and a locking position wherein each of said mobile elements (8, 9) are rigidly linked to said at least one rigid element (5, 6, 7), said ring (3) including an arch-shaped fixed front element (5), an arch-shaped fixed rear element (6), a fixed side element (7) extending on each side of the vehicle and contained between two mobile elements (8, 9) integrated in the two doors (1, 2), each of said two elements (8, 9) being adjacent to one end of an arch-shaped element (5, 6).

4. A device according to claim 1, wherein said locking means comprise means to centre said rigid elements (5, 6, 7) and said mobile elements (8, 9) with respect to one another, and means for clamping end faces (5a, 8a) of the elements against one another.

5. A device for reinforcing a vehicle equipped with a retractable roof comprising at least one rigid element (5, 6, 7) secured to a fixed part of a body of the vehicle, and at least one mobile element (8, 9) integrated in an upper part of at least one door (1, 2) of the vehicle, (4) said at least one mobile element (8, 9) located in an extension of said at least one rigid element (5, 6, 7) when said at least one door (1, 2) is closed, each mobile element (8, 9) comprising, at an end adjacent said at least one mobile element (8, 9), locking means actuatable between an unlocking position and a locking position wherein said mobile element (8, 9) is rigidly linked to said at least one rigid element (5, 6, 7) and form together a reinforcing bar extending over a length of a vehicle passenger compartment (4) such that rigidity is uniformly distributed over an entire length of said reinforcing bar, said at least one rigid element (5, 6, 7) and said at least one mobile element (8, 9) being tubular.

6. A device according to claim 4, characterised in that the locking means comprise a slide (10) mounted so as to slide in a bore (11) formed in one (8) of the elements and carrying at its end a cone (12) projecting in the locking position from the end face (8a) of said element (8) in order to fit into a complementary recess (13) formed in the end face (5a) of the other element (5).

7. A device according to claim 6, characterised in that said bore (11) has at least one axial groove wherein there is fitted a key (14) integral with the slide (10) for axially guiding the sliding of said slide (10) and immobilising it rotationally.

8. A device according to claim 6, characterised in that the sliding of the slide (10) is controlled by a shaft (15) extending axially in the element (8) and having a threaded end (16) fitted in a tapping (17) made in the slide (10), said shaft (15) being coupled to an electric motor (18) for driving it rotationally.

9. A device according to claim 6, wherein said locking means includes at least one clamping jaw (21) mounted so as to pivot in a housing (22) in said cone (12) along an axis (23) perpendicular to an axis (24) of said slide (10), said jaw (21) having at each end a bearing surface (25, 26) projecting in a direction opposite to said axis (24) of the slide (10), each element (8, 5) having inclined ramps (27, 28) interior and proximal an end face thereof, said inclined ramps cooperating with said projecting bearing surfaces (25, 26) of said jaw (21) so that, upon fitting of said cone (12) into a recess (13) of said element (5), pressing of said projecting bearing surfaces (25, 26) at a rear portion of said jaw (21) on a corresponding ramp (27) causes pivoting of said jaw (21) and pressing of a front projecting bearing surface (25) thereof against a ramp of said ramps of said element (5).

10. A device according to claim 9, characterised in that it comprises a second jaw (21a) mounted on the same axis (23) and cooperating with inclined ramps (27a, 28a) disposed symmetrically with respect to those cooperating with the first jaw (21).

11. A device according to claim 10, characterised in that each jaw (21, 21a) cooperates with a spring (29) tending to make the jaw pivot towards a position opposite said ramps.

12. A device according to claim 10, wherein one (5) of said rigid elements has at an end thereof a sleeve (30) secured so as to be adjustable inside said rigid element (5) in order to axially adjust a position of an end face (5a) thereof, an internal face of said sleeve carrying said inclined ramps (28, 28a).

13. A device according to claim 2, characterised in that it comprises a second rigid ring (33) parallel to the first ring (3), consisting of fixed elements (34, 35, 36) and mobile elements (37, 38), the mobile elements (37, 38) being integrated in the lower part of each door (1, 2) and linked to the fixed elements by locking means identical to those which link the elements of the first ring (3).

14. A device for reinforcing a vehicle equipped with a retractable roof, comprising at least one rigid element (5, 6, 7) secured to a fixed part of a body of the vehicle, and at least one mobile element (8, 9) integrated in an upper part of at least one door (1, 2) of the vehicle, (4) said at least one mobile element (8, 9) located in an extension of said at least one rigid element (5, 6, 7) when said at least one door (1, 2) is closed, each mobile element (8, 9) comprising, at an end adjacent said at least one mobile element (8, 9), locking means actuatable between an unlocking position and a locking position wherein said mobile element (8, 9) is rigidly linked to said at least one rigid element (5, 6, 7) and form together a reinforcing bar extending over a length of a vehicle passenger compartment (4) such that rigidity is uniformly distributed over an entire length of said reinforcing bar, said at least one door (1, 2) having an upper rigid element (39, 41) and a lower rigid element (40, 42) extending horizontally from an edge of said at least one door opposite hinges (43) thereof, said rigid elements being located in an extension of rigid elements (44, 45; 46, 47) secured to a fixed part of said body of said vehicle, said elements integrated in said at least one door being linked to one another by a vertical rigid element (48, 49).

15. A device according to claim 14, wherein said means providing the locking between mobile and rigid elements comprise shafts (50, 51, 52) mounted so as to rotate in said elements integrated in said at least one door, a shaft (50) of said shafts extending in a vertical element (48, 49) being linked by bevel gears (54) to other shafts (51, 52) of said shafts extending in remaining elements of said elements.

* * * * *